April 9, 1968

S. ASIN ETAL 3,376,659

DEMONSTRATION DEVICE

Filed June 9, 1965

INVENTORS
Samson Asin
George J. Maloney and
Danforth Q. Robinson
Brown & Mikulka
Attorneys it would be similar to that of FIG. 1, a plaque 20
United States Patent Office 3,376,659
Patented Apr. 9, 1968

3,376,659
DEMONSTRATION DEVICE
Samson Asin, New Brunswick, George T. Maloney, North Plainfield, and Danforth R. Robinson, New Providence, N.J., assignors to C. R. Bard, Inc., Murray Hill, N.J., a corporation of New York
Filed June 9, 1965, Ser. No. 462,608
8 Claims. (Cl. 35—17)

ABSTRACT OF THE DISCLOSURE

A demonstration device for use in instructing personnel in the use of medical and surgical apparatus of the type in which a tube or the like is passed into internal passages of a living being, so constructed that the introduction of fluids into said internal passages can be demonstrated by actual introduction of fluids into the device; the construction of the device being such that it is basically flat, but modified to three-dimensional form in certain areas to provide internal passages into which apparatus and/or medication (simulated or not) can be introduced, the location of said passages and of the apparatus or medication therein being visually observable.

---

This invention relates to a demonstration device for use in instructing personnel in the use of medical and surgical apparatus of the type in which a tube or the like is passed into internal passages of a living being and which may also be used in demonstrating the use of other medical and surgical apparatus wherein a fluid is introduced into the internal passages of a living being. The invention is particularly adaptable for, but not limited to, instructing personnel in the use of gastro-intestinal tubes and of catheters, cannulas, and the like for urological, intravenous or other types of therapy.

It is an object of the invention to provide a training device in which internal passages of a living being are depicted pictorially and formed with coincidental three-dimensional channels to receive medical apparatus such as gastrointestinal tubes, catheters, cannulas, and the like to simulate actual use of the latter.

A further object is to provide certain improvements in the form, construction, arrangement and material of the several elements whereby the above named and other objects may effectively be maintained.

A practical embodiment of the invention is shown in the accompanying drawings wherein.

Figure 1:
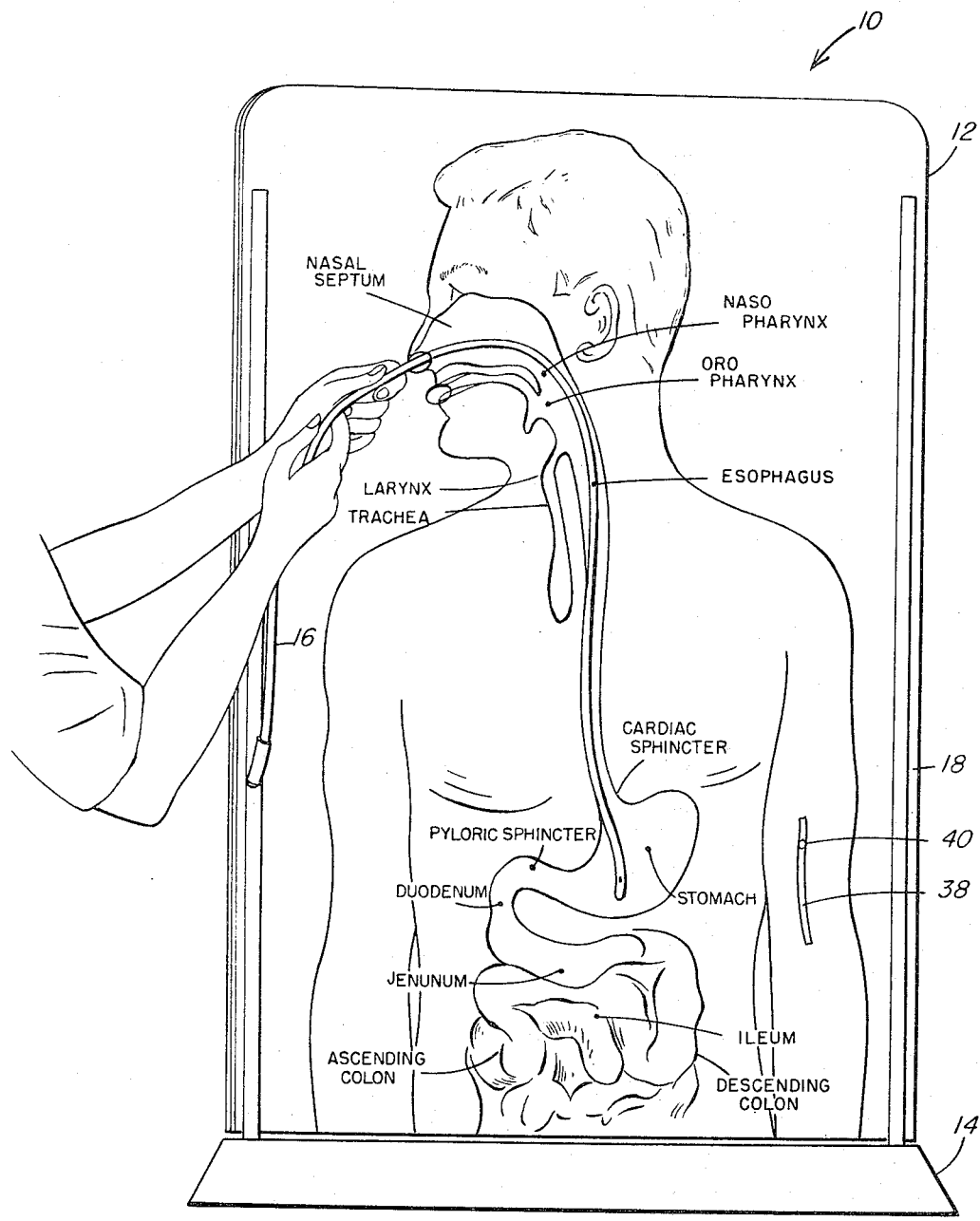
FIG. 1 is a front elevational view of one embodiment of the invention as used to demonstrate the passing of a tube into the stomach.

The use of medical apparatus of the type where a tube or the like is to be passed internally presents many difficulties and hazards in that the tube is not visible within the internal passages. This is particularly applicable to the uninitiated or when new apparatus is being used for the first time by otherwise experienced personnel. Consequently, it is necessary that the user be very circumspect and exercise sound judgment based on experience and on knowledge of the function, makeup, positions, and configuration of the various internal passages. In attempting to pass a Levin tube through the nasal passage to the stomach, for example, the tube may inadvertently slip into the trachea and/or bronchus. The user must, therefore, be familiar with the possibilities of such pitfalls and should be aware of the location of the forward end of the tube at all times as it is being passed.

For illustrating the invention, we have shown in the drawings a demonstration device for training personnel in passing a Levin tube to the stomach. As will be further described, the invention may also be embodied in other variations, for example, in instructing in the use of catheters, cannulas, and the like for urological, intravenous or other types of therapy.

Referring to the drawings, the demonstration device indicated generally at 10 comprises a plaque 12 suitably held upright by a support stand 14. The plaque 12 has illustrated and suitably labeled thereon parts of the internal organs of an upper portion of the human anatomy. The plaque 12 is generally flat except for projections which define three-dimensional channels which are coincident with certain of the illustrated internal passages and which are adapted to receive a Levin tube 16 for demonstration purposes.

Figure 2:
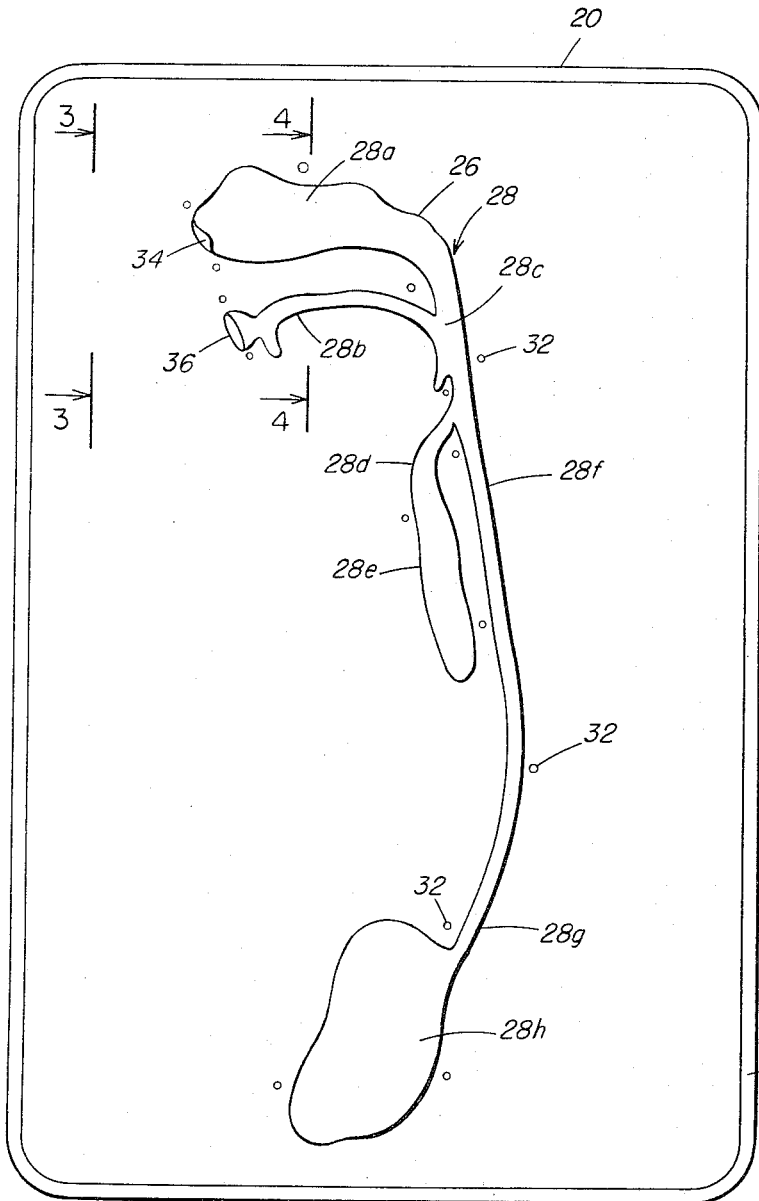
FIG. 2 is an elevational view of a plaque similar to that of FIG. 1 excluding the detailed pictorial representation.
Figure 3:
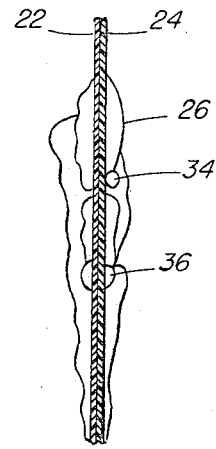
FIG. 3 is a sectional view taken along the line 3—3 of FIG. 2.
Figure 4:
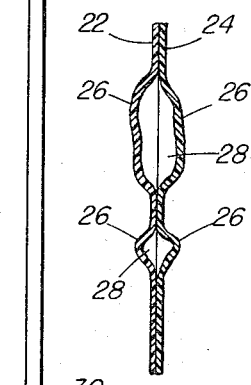
FIG. 4 is a sectional view taken along the line 4—4 of FIG. 2.

Turning now to more specific details of construction and referring particularly to FIGS. 2 to 4 on which the detailed pictorial representation is not shown but in which is shown as being made of two generally flat panels 22 and 24 on which are formed raised projections 26. These projections have the configuration shown in FIG. 2 to conform to the outline of certain internal passages of the human body. The projections are arranged such that when the panels 22 and 24 are mated, the projections 26 will align to form a channel 28 therebetween which conforms in size and shape to the aforementioned internal passages.

As best shown in FIG. 4 the projections 26 on each panel form a half section of the channel 28. The projections 26 may be made on each panel by any convenient method, for example, by conventional vacuum forming, i.e. by providing a mold having the half sectional shape of the channel thereon, placing the panel thereover, applying heat if necessary to soften the panel, and applying a vacuum between the mold and panel to draw or pull down the latter over the mold. After the projections are formed on both panels, they are mated as previously described, and then suitably joined as by applying a transparent adhesive about the peripheral edges 30 and by applying fastening members such as the rivets 32 at various locations, e.g. adjacent the channel 28. As alternate constructions, abutting surfaces of the two panels may be joined in fluid tight relationship by transparent adhesive or by a heat seal. When the panels 22 and 24 are joined, the channel 28 is closed except for openings 34 and 36 which simulate nasal and oral openings. The Levin tube is adapted to be inserted through either one of these openings 34 or 36 into the closed channel 28.

The art work, i.e. the pictorial representation of the head, body, arms, internal passages and organs along with the identifying labels and other embellishments, may be applied to the flat front face of the rear panel 22 before the latter is formed with the projections 26. This may be done by conventional reproducing or printing methods. The projections 26 are subsequently formed on the panel 22 to align with certain of the internal passages depicted by the art work. For example, the section 28a will coincide with nasal septum, 28b with the the oral cavity, 28c with the oro-pharynx, 28d with the larynx, 28e with the trachea, 28f with the esophagus, 28g with cardiac sphincter, and 28h with the stomach. The forming of the projections on the rear panel 22 will not adversely affect the art work but if desired, the pictorial representation of certain passages may be made to anticipate any distortion caused by forming of the projections. the identifying word labels and the outline of the human In alternate arrangements, part of the art work, e.g. body, may be placed on the front panel 24 and, if desired, all of the art work may be applied to the front panel 24. In the latter case, at least portions of the art work, e.g. in front of the channel 28, are portrayed with a transparent material. As an alternate construction, the raised projections 26 on the rear panel may be eliminated, the projections in the front panel then being formed with sufficient depth to accommodate the tubes or the like to be inserted.

The rear panel 22 may be made of an opaque or of a translucent material such as translucent vinyl. The front panel 24 on the other hand is made of a transparent material such as clear acetate such that the art work and the inside of the channel 28 are clearly visible therethrough.

The pictorial representation and the size and shape of the channel 28 may be made generally to scale of an average size person. Also portions of the channel 28 may be restricted as at 28f to offer resistance to the passage of the Levin tube, thus simulating the type of resistance that might be encountered in practice.

In normal use, the plaque is mounted in an upright position, for example, by the stand shown in FIG. 1. The stand comprises a base 14 on which is carried one or two uprights 18 suitably affixed to the plaque as by fastening clamps (not shown) or adhesive. The plaque may also be supported by a rear projecting leg (not shown) or it may be propped up against a wall or on an easel. The instructor may then take the Levin tube 16 and insert it either through the nasal opening 34 or oral opening 36 and being to feed the tube into the channel 28. The tube is visible through the transparent front panel 24 and the instructor may point out the various organs and passages as the trainees follow the path of travel of the tube into and beyond the various passages and organs. At various stages of the insertion, the instructor may point out the conditions and problems that may be encountered such as patient reactions, instructions to be given the patient to aid in passing the tube, and how to tell if the tube has inadvertently slipped into the trachea. In the case of the latter, the instructor may actually pass the tube into the portion 28e of the channel representing the trachea.

Although the embodiment of FIGS. 2 to 4 shows the channel terminating in the stomach 28h, other embodiments may have the channel extended to simulate pyloric sphincter, duodenum, jenunum, and descending colon (see FIG. 1) to instruct in passing the tube to the latter, and further as required, for intestinal intubation. In this latter case the end of the tube may be weighted (as in Andersen Patent No. 3,189,031) to aid in propelling the tube through these passages. Since in actual practice the patient may be placed in different positions to assist in passing the tube, the plaque may be turned or tilted as required to simulate such positions. A support stand with pivotal mounting (not shown) may be used for this if desired.

The invention may be further embodied in devices used for instructing in the use of catheters, cannulas, and the like for intravenous or urological therapy. In the latter case the pictorial representation may be that of the lower portion of the anatomy and the channels may be made to coincide with the urethral passages and bladder. For intravenous therapy, the various veins, arteries, and organs may be pictorially represented with the channel coinciding therewith as desired. As shown in FIG. 1, for example, raised projections constructed in the same manner as the projections 26 in FIGS. 2 and 4, may be made on the panels to form a channel 38 simulating a vein in the arm. Suitable pictorial representation of the vein is applied to one of the panels, as previously described, and an opening 40 provided in the front panel 24 for insertion of a cannula, catheter, or the like to demonstrate use of the latter, for example, in connection with intravenous feeding.

As previously mentioned, the two panels may be joined by a heat seal or the like. This construction makes the channel 28 fluid tight adapting it to receive a fluid whereby it may be employed in simulating and demonstrating the flow path of a fluid injected or otherwise introduced into the human body, for example, as in irrigating the colon or in taking medication via needle and syringe. Restrictions or other flow control devices (not shown) may be employed to control the flow of the fluid through the various sections of the channel to simulate flow in a living being. Also drain and vent openings (not shown) may be provided as desired.

It will be understood that various changes may be made in the form, construction and arrangement of the several parts without departing from the spirit and scope of the invention, and hence we do not intend to be limited to the details shown or described herein except as the same are included in the claims or may be required by disclosures of the prior art.

What we claim is:

1. A device for instructing personnel in the use of medical and surgical apparatus of the type in which a tube or the like is passed into internal passages of a living being, comprising a generally flat plaque at least one surface of which is formed with integral raised projections to constitute a three-dimensional channel conforming to the configuration of said internal passages, and means on said structure providing access to said channel for introduction of said medical and surgical apparatus, at least one surface of said plaque being transparent in the area of said raised projections so that said medical and surgical apparatus may be readily observed in said channel.

2. A device as set forth in claim 1 wherein said three-dimensional channel has a restricted portion adapted to provide resistance to the passage of said surgical and medical apparatus therethrough, said resistance simulating that encountered in actual use.

3. A device as set forth in claim 1 wherein said structure comprises a front panel and a rear panel each having complementary opposed raised sections representing approximately half sections of said three dimensional channel.

4. A device as set forth in claim 3 wherein said front panel is made of a transparent material.

5. A device as set forth in claim 3 wherein said rear panel is made of a translucent material.

6. A device as set forth in claim 5 wherein there are means on said rear panel representing pictorially internal passages of a living being.

7. A device as set forth in claim 3 further comprising means joining said front and rear panels to form a fluid tight three-dimensional channel.

8. A device for instructing personnel in the use of medical and surgical equipment of the type in which a tube or the like is passed into internal passages of a living being, comprising a rear panel having a pictorial representation of said internal passage, a front panel mated with said rear panel, opposed raised projections on each of said panels forming half sections of a channel coincident with said pictorially represented passages, means affixing said two panels in mated position and means defining openings leading to said channel to provide access thereto for said tube, said front panel being made of a transparent material so that said tube may be readily observed as it is passed into said channel.

References Cited

UNITED STATES PATENTS

| | | | |
|---|---|---|---|
| 891,971 | 6/1908 | Bade et al. | 35—20 |
| 1,600,599 | 9/1926 | Parker | 35—20 |
| 2,034,446 | 3/1936 | Saxe | 35—17 |
| 2,345,489 | 3/1944 | Lord | 35—17 |
| 3,055,124 | 9/1962 | Gilmer et al. | 35—46 |
| 3,273,261 | 9/1966 | Lovercheck | 35—17 |

EUGENE R. CAPOZIO, *Primary Examiner.*

H. S. SKOGQUIST, *Assistant Examiner.*